US009560216B2

(12) United States Patent
Li et al.

(10) Patent No.: US 9,560,216 B2
(45) Date of Patent: Jan. 31, 2017

(54) METHOD AND APPARATUS FOR PERFORMING ROAMING TRAFFIC CHARGING FOR A UE

(71) Applicant: Alcatel Lucent, Boulogne Billancourt (FR)

(72) Inventors: Xiangyang Li, Shanghai (CN); Yongpei Hu, Shanghai (CN); Wanbin Yan, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/650,773

(22) PCT Filed: Dec. 2, 2013

(86) PCT No.: PCT/IB2013/002892
§ 371 (c)(1),
(2) Date: Jun. 9, 2015

(87) PCT Pub. No.: WO2014/091299
PCT Pub. Date: Jun. 19, 2014

(65) Prior Publication Data
US 2015/0319594 A1    Nov. 5, 2015

(30) Foreign Application Priority Data

Dec. 11, 2012    (CN) .......................... 2012 1 0533817

(51) Int. Cl.
*H04M 11/00*    (2006.01)
*H04M 15/00*    (2006.01)
(Continued)

(52) U.S. Cl.
CPC ......... *H04M 15/8038* (2013.01); *H04M 15/64* (2013.01); *H04M 15/8044* (2013.01);
(Continued)

(58) Field of Classification Search
None
See application file for complete search history.

(56) References Cited

U.S. PATENT DOCUMENTS

| 8,175,575 | B2 | 5/2012 | Cai et al. | |
| 2001/0041557 | A1* | 11/2001 | Hurme | H04W 4/16 455/410 |
| 2009/0327112 | A1* | 12/2009 | Li | G06Q 30/0283 705/34 |

FOREIGN PATENT DOCUMENTS

| EP | 2 051 549 A1 | 4/2009 |
| EP | 2 523 388 A1 | 11/2012 |

(Continued)

OTHER PUBLICATIONS

"Roaming Regulation—Choice of Decoupling Method, A Consultation to assist BEREC in preparing advice to the Commission on its forthcoming Implementing Act," BoR (12) 68, pp. 1-48, Annex 3: Competition analysis of decoupling solutions, pp. 1-15, XP055120826, Jun. 2012.

(Continued)

*Primary Examiner* — Shantell L Heiber
(74) *Attorney, Agent, or Firm* — Fay Sharpe, LLP

(57) ABSTRACT

An objective of the present invention is to provide a method and apparatus for performing roaming traffic charging for a user equipment; receiving a roaming traffic charging request about the user equipment, wherein the user equipment roams to a visited network, the roaming traffic charging request includes roaming traffic-related information of the user equipment; if the roaming traffic-related information satisfies a first charging condition, forwarding the roaming traffic charging request to an OCS of an alternative roaming provider corresponding to the user equipment so as to perform the roaming traffic charging for the user equipment, wherein the alternative roaming provider corresponds to a (Continued)

home network of the user equipment. Compared with the prior art, the present invention provides an innovative online charging solution to support an alternative roaming provider, which is based on the new EU roaming regulations and independent from H-MNO, for roaming tariff; enables operators to support new EU roaming regulations and fulfill most of EU Commission's expectations without causing a great impact to the core network.

13 Claims, 8 Drawing Sheets

(51) Int. Cl.
*H04W 8/02* (2009.01)
*H04W 4/14* (2009.01)
*H04W 4/24* (2009.01)

(52) U.S. Cl.
CPC ......... *H04M 15/8083* (2013.01); *H04W 4/14* (2013.01); *H04W 4/24* (2013.01); *H04W 8/02* (2013.01)

(56) References Cited

FOREIGN PATENT DOCUMENTS

| EP | 2 725 831 A | 4/2014 |
| JP | H 11-296583 A | 10/1999 |
| JP | 2002/150196 A | 5/2002 |
| JP | 2011-524100 A | 8/2011 |
| WO | WO 2011/120217 A1 | 10/2011 |
| WO | WO 2013/160761 A1 | 10/2013 |

OTHER PUBLICATIONS

"Overview of the technical framework for the separate sale of roaming services in the European Union," ETSI, TR 1 03 227 V0.0.3, pp. 1-13, XP014162363, Nov. 2013.
International Search Report for PCT/IB2013/002892 dated Jun. 26, 2014.

* cited by examiner

METHOD AND APPARATUS FOR PERFORMING ROAMING TRAFFIC CHARGING FOR A UE

FIELD OF THE INVENTION

The present invention relates to the field of communications technology, and more specifically, to a technique of performing roaming traffic charging for a UE.

BACKGROUND OF THE INVENTION

In May and June 2012, European Parliament and representatives of the Council and the European Commission have reached a preliminary deal on new EU (European Union) roaming rules that will fundamentally change the market for international roaming to the benefit of holidaymakers and business users alike.

From 1 Jul. 2014, customers would have the option to sign up for a cheaper mobile roaming contract, separate from their contract for national mobile services, while keeping the same phone number. Consumers will therefore be able to easily compare roaming services (independently from other mobile services) and benefit from lower prices.

The European Commission proposes more competition, and more choice and lower prices for the mobile phone user abroad. The proposal would also give mobile operators (including so-called virtual mobile operators, who do not have their own network) the right to use other operators' networks in other Member Country at regulated wholesale prices, and so encourage more operators to compete on the roaming market. To cover the period until structural measures become fully effective and competition drives retail prices down, the proposal would progressively lower current retail price caps on voice and texting (SMS) services and introduce a new retail price cap for mobile data services.

To support the new EU roaming regulation, the most European operators are urgently asking customer to propose solution to support the new regulation, so the people will have the option to immediately choose an alternative roaming provider (ARP) as of 1 Jul. 2014.

Currently, the roaming contract of end user is still defined by Home Mobile Network Operator (H-MVO), the roaming tariff plan is closely bundled into the home tariff plan.

This current roaming charging solution doesn't support the new EU regulation requirement. As the new EU regulation requirement, the mobile roaming contract shall be separated from their contract for national mobile services, while keeping the same phone number, the mobile roaming service and payment contract can be offered from the different alternative roaming partners.

SUMMARY OF THE INVENTION

An objective of the present invention is to provide a method and apparatus for performing roaming traffic charging for a user equipment.

According to one aspect of the present invention, there is provided a method for performing roaming traffic charging for a user equipment, wherein the method comprises steps of:

a. receiving a roaming traffic charging request about the user equipment, wherein the user equipment roams to a visited network, the roaming traffic charging request includes roaming traffic-related information of the user equipment;

b. if the roaming traffic-related information satisfies a first charging condition, forwarding the roaming traffic charging request to an OCS of an alternative roaming provider corresponding to the user equipment so as to perform the roaming traffic charging for the user equipment, wherein the alternative roaming provider corresponds to a home network of the user equipment.

According to another aspect of the present invention, there is provided a method, at an alternative roaming provider, for performing roaming traffic charging for a user equipment, wherein the alternative roaming provider corresponds to a home network of the user equipment, the method comprising steps of:

A. receiving a roaming traffic charging request for performing roaming traffic charging for a user equipment, wherein the roaming traffic charging request includes roaming traffic-related information of the user equipment;

B. performing match query in a user database based on the roaming traffic charging request to obtain roaming reservation information of the user equipment;

C. performing the roaming traffic charging for the user equipment based on the roaming traffic-related information and the roaming reservation information.

According to a further aspect of the present invention, there is further provided an apparatus for performing roaming traffic charging for a user equipment, wherein the apparatus comprises:

a first receiving device configured to receive a roaming traffic charging request about the user equipment, wherein the user equipment roams to a visited network, the roaming traffic charging request includes roaming traffic-related information of the user equipment;

a request forwarding device configured to, if the roaming traffic-related information satisfies a first charging condition, forward the roaming traffic charging request to an OCS of an alternative roaming provider corresponding to the user equipment so as to perform the roaming traffic charging for the user equipment, wherein the alternative roaming provider corresponds to a home network of the user equipment.

According to a further aspect of the present invention, there is further provided an apparatus, at an alternative roaming provider, for performing roaming traffic charging for a user equipment, wherein the alternative roaming provider corresponds to a home network of the user equipment, the apparatus comprising:

a second receiving device configured to receive a roaming traffic charging request for performing roaming traffic charging for a user equipment, wherein the roaming traffic charging request includes roaming traffic-related information of the user equipment;

an information matching device configured to perform match query in a user database based on the roaming traffic charging request to obtain roaming reservation information of the user equipment;

a charging processing device configured to perform the roaming traffic charging for the user equipment based on the roaming traffic-related information and the roaming reservation information.

According to a further aspect of the present invention, there is further provided an OCS for performing roaming traffic charging for a user equipment, comprising an apparatus mentioned above.

Compared with the prior art, the present invention judges roaming traffic-related information of a user equipment (UE). When it satisfies a first charging condition, a roaming traffic charging request from the UE is forwarded to an OCS of an alternative roaming provider corresponding to the UE, to be available for performing roaming traffic charging for the UE, which thereby enhances a user's use experience. The present invention provides an innovative online charging solution to support an alternative roaming provider, which is based on the new EU roaming regulations and independent from H-MNO, for roaming tariff. The present invention enables operators to support new EU roaming regulations and fulfill most of EU Commission's expectations (especially the timeframe 2014) without causing a great impact to the core network.

BRIEF DESCRIPTION OF THE DRAWINGS

Through reading the following detailed depiction on the non-limiting embodiments with reference to the accompanying drawings, the other features, objectives, and advantages of the present invention will become more apparent.

Same or like reference numerals in the accompanying drawings indicate the same or corresponding components.

DETAILED DESCRIPTION OF THE INVENTION

Hereinafter, the present invention will be further depicted in detail with reference to the accompanying drawings.

Figure 1:
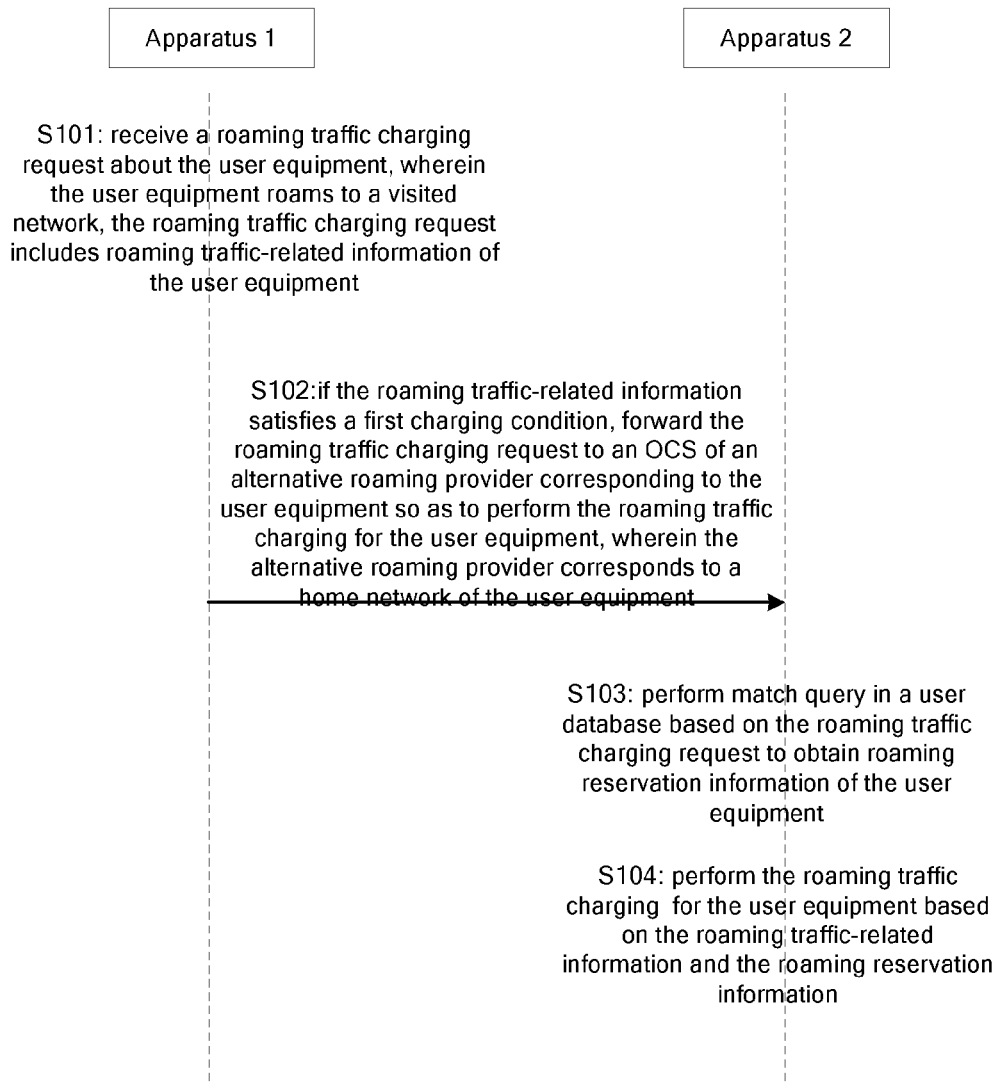
FIG. 1 shows a flowchart of a method of performing roaming traffic charging for a user equipment according to one aspect of the present invention.

FIG. 1 shows a flowchart of a method of performing roaming traffic charging for a user equipment according to one aspect of the present invention.

At step S101, an apparatus 1 receives a roaming traffic charging request about the UE, wherein the UE roams to a visited network, wherein the roaming traffic charging request includes roaming traffic-related information of the user equipment.

Here, the apparatus 1 may be located within an OCS of a home public land mobile network (HPLMN) corresponding to the user equipment 1 or independent from an OCS of the home network.

For example, the UE roams to a visited public land mobile network (VPLMN). When the apparatus 1 is located within the OCS of a home network corresponding to the UE1, the apparatus 1 directly receives the roaming traffic charging request sent from the visited network, e.g., receiving a roaming traffic charging request sent from a network element in the visited network, such as a visited mobile switching center (V-MSC), a gateway mobile switching center (G-MSC), a serving call session control function (S-CSCF), a short message service center (SMSC), a multimedia message service center (MMSC), and a gateway GPRS support node (GGSN)/a packet gateway (PGW), wherein the roaming traffic charging request includes roaming traffic-related information of the UE, for example, information such as calls, SMSs, MMSs or packet data as performed by the UE in the visited network.

Here, the roaming traffic-related information includes, but not limited to, the Mobile Station Roaming Number (MSRN), the International Mobile Subscriber Identity (IMSI), the Mobile Station ISDN Number (MSISDN), the incoming caller phone number, the call timing, SMS, MMS, or packet data, and other information of the user equipment in the visited network.

Those skilled in the art should understand that the above roaming traffic-related information is only an example, and other existing or future possibly evolving roaming traffic-related information, if applicable to the present invention, should also be included within the protection scope of the present invention, which is incorporated here by reference.

For another example, when the apparatus 1 is independent from the home network OCS, the apparatus 1 may also directly receive the roaming traffic charging request sent from the visited network, for example, receiving the roaming traffic charging request sent from any of the above network elements in the visited network, wherein the roaming traffic charging request includes roaming traffic-related information of the user equipment.

In step S102, if the roaming traffic-related information satisfies the first charging condition, the apparatus 1 will forward the roaming traffic charging request to the OCS of the alternative roaming provider (ARP) corresponding to the user equipment, so as to perform roaming traffic charging for the user equipment, wherein the alternative roaming provider corresponds to a home network of the user equipment; wherein the first charging condition includes at least any one of the following:
  the user equipment roams to a member country visited network, and a call/SMS/MMS receiving end of the user equipment is also located in the member country visited network;
  the user equipment roams to the member country visited network, and the user equipment receives the call/SMS/MMS;
  the user equipment roams to the member country visited network, and the user equipment has a packet data connection;
  wherein the member country visited network and the home network of the user equipment have a member protocol.

Here, the member protocol, for example, is the aforementioned EU roaming regulation; the member country visited network, for example, is a mobile network of a country that satisfies the EU roaming regulation.

Figure 2:
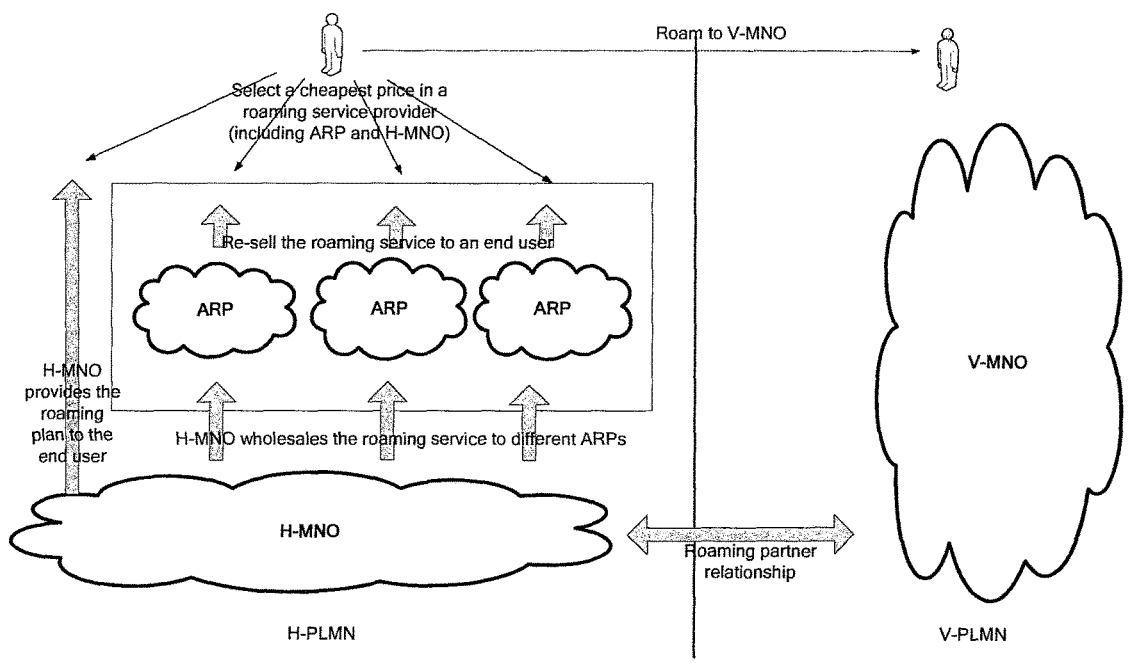
FIG. 2 shows a schematic diagram of performing roaming traffic charging for a user equipment according to a preferred embodiment of the present invention.

Here, as shown in FIG. 2, the alternative roaming provider (ARP) corresponds to the home network of the user equipment, and the operator of the home network wholesales the roaming service to different alternative roaming providers;

the alternative roaming provider will re-sell the roaming services to the end-user under its own name and on its own account; the home network also provides its roaming services to the end user; the end user chooses one of the roaming services from a plurality of alternative roaming providers and the home network, for example, selecting the cheapest roaming service; the mobile end user will still keep the same number, i.e. not changing the mobile terminal device and his SIM card when the end user is in roaming When the end user roams into a visited network and uses the roaming service in the visited network, the network element in the visited network sends a roaming traffic charging request to the apparatus 1. The apparatus 1 receives the roaming traffic charging request and determines to which OCS the roaming traffic charging request is forwarded based on the roaming traffic-related information included in the charging request, for example, forwarding it to the OCS of the alternative roaming provider selected by the end user, or forwarding it to the OCS in the home network of the end user. For example, based on the call/SMS/MMS receiving end of the user equipment in the visited network as included in the charging request, the apparatus 1 determines that the receiving end is also located within the member country visited network, then the apparatus 1 judges that the roaming traffic-related information satisfies the first charging condition, such that the apparatus 1 will forward the roaming traffic charging request to the OCS of the alternative roaming provider selected in advance by the user equipment; for another example, if the apparatus 1 determines that the user equipment receives the call/SMS/MMS within the member country visited network based on the charging request, then it is judged that the first charging condition is satisfied; for another example, if the apparatus 1 determines that the user equipment has packet data connection in the member country visited network based on the charging request, then it is judged that the first charging condition is satisfied.

If the roaming traffic-related information does not satisfy the first charging condition, then roaming traffic charging is performed for the user equipment within the OCS of the home network of the user equipment; if the apparatus 1 is located within the OCS of the home network, the OCS of the home network directly performs charging for the user equipment; when the apparatus 1 is independent from the OCS of the home network, the apparatus 1 forwards the roaming traffic charging request to the OCS of the home network so as to perform roaming traffic charging for the user equipment.

Those skilled in the art should understand that the above first charging condition is only exemplary, and other existing or future possibly evolving first charging condition, if applicable to the present invention, should also be included within the protection scope of the present invention, which is incorporated hereby by reference.

Here, the OCS of the alternative roaming provider manages and charges the roaming traffic regulated by the new EU roaming regulation, for example, a roaming traffic satisfying the first charging condition as aforementioned. Thus, the alternative roaming provider will be capable of providing the roaming charging rule to the end user, for example, before the end user roams to other country, a roaming service is first subscribed for from a customer relationship management (CRM) system/user website, e.g., a 5-day roaming contract, a 10-day roaming contract, and etc.

The OCS of the home network will manage and charge the non-roaming traffic and those roaming traffics out of new EU regulation scope, e.g. a European subscriber is roaming to the United States, or a EU subscriber roaming in another EU country makes a call to another non-EU subscriber. Such kinds of roaming calls are not regulated by the new EU regulation but are still charged in the OCS of home network.

Preferably, in step S102, if the roaming traffic-related information satisfies the first charging condition, the apparatus 1 performs match query in the address information base, to determine the address information of the OCS of the alternative roaming provider corresponding to the user equipment; forwards the roaming traffic charging request to the OCS of the alternative roaming provider based on the address information, so as to perform the roaming traffic charging for the user equipment, wherein the alternative roaming provider corresponds to the home network of the user equipment.

Specifically, in step S102, if the roaming traffic-related information satisfies the first charging condition (i.e., when the user equipment roams to the member country visited network, and the call/SMS/MMS receiving end of the user equipment is also located within the member country visited network; or, the user equipment roams to the member country visited network, and the user equipment receives the call/SMS/MMS; or, the user equipment roams to the member country visited network, and the user equipment has a packet data connection; wherein the member country visited network and the home network of the user equipment have a member protocol that is, for example, the EU roaming regulation as aforementioned), the apparatus 1 performs match query in the address information base (e.g., stored in the ARP database at the H-MNO end) based on relevant information of the user equipment (e.g., the international mobile subscriber identification number (IMSI), the mobile station international ISDN number, and the like), to determine the address information of the OCS of the alternative roaming provider corresponding to the user equipment, for example, performing match query in the address information base based on the alternative roaming provider selected by the user equipment before roaming to the visited network, to determine the address information of the OCS of the alternative roaming provider; and then, forwards the roaming traffic charging request to the OCS of the alternative roaming provider based on the address information so as to perform the roaming traffic charging for the user equipment, wherein the alternative roaming provider corresponds to the home network of the user equipment.

Here, the address information base stores a mapping relationship between the user equipment and the alternative roaming provider, for example, the mapping relationship between the ISMI of the user equipment, the mobile station international ISDN number, and the OCS address of the alternative roaming provider. The address information base, for example, is located within the home network corresponding to the user equipment, is managed by the home network, and updated by the alternative roaming provider based on the selection of the terminal user.

For example, when the user selects the roaming service of an alternative roaming provider, the present invention enables the alternative roaming provider to update the selection of the terminal user to the address information base (e.g., the ARP database as aforementioned) in the home network, for example, providing information such as the IMSI of the user equipment corresponding to the end user and the mobile station international ISDN number, as well as the address information of OCS of the selected alternative roaming provider, to the ARP database for update. Based on the roaming traffic-related information included in the roaming traffic charging request of the user equipment, the apparatus 1 will know to the OCS of which ARP the roaming traffic charging request is routed, or the roaming traffic charging request is routed to the OCS of the home network.

Figure 3:
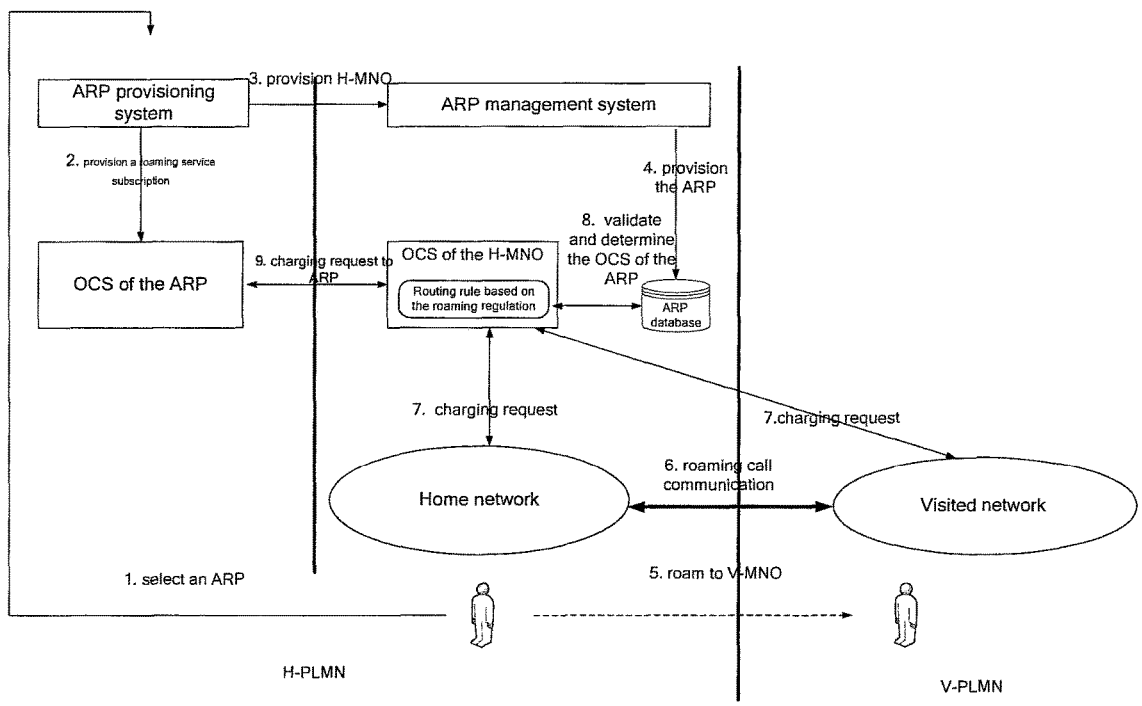
FIG. 3 shows a schematic diagram of performing roaming traffic charging for a user equipment according to a preferred embodiment of the present invention.

For example, as shown in FIG. 3, when the terminal user selects to travel to a EU roaming country, it will select an alternative roaming provider that will provide a best roaming plan to the end user; the end user will customize a roaming service from the CRM system/user website of the alternative roaming provider, and the roaming service in the OCS of the alternative roaming provider specifies the user's roaming reservation and charging plan (e.g., a 5-day roaming contract, a 10-day roaming contract); a provisioning system of the alternative roaming provider will send a request to the ARP management system of the H-MNO; the ARP management system of the H-MNO will provide the ARP database (e.g., the aforementioned address information base) to save the alternative roaming provider selected by each user, the address of the OCS of the alternative roaming provider, and the start and end period of the roaming service; afterwards, the end user begins to travel to the EU country; the end user makes a call or receives a call in the EU roaming country; the visited network sends a roaming service charging request about the end user to the apparatus 1 (e.g., an apparatus 1 in the OCS of the H-MNO or an apparatus 1 independent from the OCS), and the apparatus 1 will confirm the roaming service in the ARP database and determines to the OCS of which alternative roaming provider the charging request is forwarded, or directly sends it to the OCS of the home network; afterwards, the charging request is forwarded to the OCS of the alternative roaming provider or directly sent to the OCS of the home network.

Correspondingly, at the alternative roaming provider, an apparatus 2 receives the roaming traffic charging request for performing roaming traffic charging for the user equipment, wherein the roaming traffic charging request includes roaming traffic-related information of the user equipment; in step S103, the apparatus 2 performs match query in the user database based on the roaming service charging request to obtain roaming reservation information of the user equipment; in step S104, the apparatus 2 performs roaming traffic charging for the user equipment based on the roaming traffic-related information and the roaming reservation information. Here, the alternative roaming provider corresponds to the home network of the user equipment.

Specifically, the apparatus 2 in the alternative roaming provider receives the roaming traffic charging request forwarded by the apparatus 1. In step S103, the apparatus 2 performs match query in the user database based on the roaming traffic charging request to obtain the roaming reservation information of the user equipment. For example, the apparatus 2 performs match query in the user database based on the mobile station roaming number, the IMSI, and the mobile station international ISDN number of the user equipment in the visited network, which are included in the roaming traffic charging request, to determine the roaming package selected by the user equipment (e.g., 5-day roaming contract, 10-day roaming contract, and other roaming reservation information); and then, in step S104, the apparatus 2 (e.g., the OCS in the alternative roaming provider) performs roaming traffic charging (e.g., performing fee deduction processing in the account of the user equipment) for the user equipment based on the roaming traffic-related information included in the roaming traffic charging request (e.g., call duration, SMS, MMS, packet data, and other information) as well as roaming reservation information such as the roaming package selected by the end user.

Preferably, after the apparatus 2 performs roaming traffic charging for the user equipment, it obtains corresponding charging result information (e.g., fee deduction amount from the account, account balance, and other information), and then sends the charging result information to the apparatus 1 through a predetermined interface (e.g., a CAP interface, a DCCA interface, etc.) with the apparatus 1.

Here, the user database stores the mapping relationship between the IMSI, the mobile station international ISDN number of the user equipment, and the selected roaming package information, and may perform setup or update based on the roaming package selected by the end user.

This invention provides an innovative online charging solution to support an alternative roaming provider which is based on the new EU roaming regulation and independent from the H-MNO to perform roaming charging. The present invention enables an operator to support the new EU regulation, and fulfill most of EU Commission's expectation (especially the timeframe 2014), without causing a great impact on the core network. Meanwhile, the present invention reduces the impact to the core network implementation. It does not change the CAMEL protocol, thereby greatly simplifying the core network implementation, which makes the solution easier to implement.

In another preferred embodiment, in step S102, if the roaming traffic-related information satisfies a second charging condition, roaming traffic charging is performed for the user equipment in the OCS of the home network of the user equipment, wherein the second charging condition includes at least one of the following:

the user equipment roams to a visited network outside of the member country visited network;

the user equipment roams to the member country visited network, but the call/SMS/MMS receiving end of the user equipment is located in a visited network outside of the member country visited network;

the user equipment roams to the member country visited network to access a content service.

For example, the apparatus 1 confirms, based on the roaming traffic-related information included in the charging request, that the user equipment roams to a visited network outside of the member country visited network, or although the user equipment roams to the member country visited network, the call/SMS/MMS receiving end of the user equipment is located at a visited network outside of the member country visited network, or although the user equipment roams to the member country visited network, it accesses a content service in the member country visited network (for example, downloading, online booking, etc.), then apparatus 1 judges that the second charging condition is satisfied, and the OCS in the home network of the user equipment performs roaming traffic charging for the user equipment.

Here, when the user equipment is located in the home network, it is still the OCS of the home network that performs charging for the user equipment.

Here, when the apparatus 1 is located in the OCS of the home network, if the roaming traffic-related information satisfies the second charging condition, then the OCS of the home network directly performs the roaming traffic charging for the user equipment.

When the apparatus 1 is independent from the OCS of the home network, if the roaming traffic-related information satisfies the second charging condition, the apparatus 1 forwards the roaming traffic charging request to the OCS of the home network, such that the OCS of the home network performs charging for the user equipment.

Those skilled in the art should understand that the above second charging condition is only exemplary, and other existing or future possibly evolving second charging condition, if applicable to the present invention, should also be included within the protection scope of the present invention, which is incorporated here by reference.

Preferably, the apparatus 2 in the alternative roaming provider may also obtain candidate roaming reservation information of a candidate user equipment, and builds or updates the user database based on the candidate roaming reservation information.

Specifically, the apparatus 2 in the alternative roaming provider obtains the candidate roaming reservation information of the candidate user equipment, for example, the roaming package selected by the end user before roaming to the visited network, and other information. The apparatus 2 determines the candidate roaming reservation information based on selection of the end user, and then stores the candidate roaming reservation information into a user database to realize setup or update of the user database.

For example, before the end user roams to the visited network, it reserves a roaming service (e.g., a 5-day roaming contract, a 10-day roaming contract, and etc.) from the CRM system/user website of the alternative roaming provider. The apparatus 2 determines the candidate roaming reservation information of the candidate user equipment corresponding to the end user based on selection of the end user, and stores the candidate roaming reservation information into the user database, for example, storing the mapping relationship between the candidate roaming reservation information and the IMSI, the mobile station international ISDN number of the candidate user equipment, and the like, into the user database, so as to build or update the user database.

Preferably, the apparatus 2 in the alternative roaming provider builds or updates the address information base based on the mapping relationship between the candidate user equipment and the alternative roaming provider, wherein the address information base stores the address information of the OCS of the alternative roaming provider.

Specifically, when the end user selects an alternative roaming provider, the alternative roaming provider will immediately stores the mapping relationship between it and a candidate user equipment corresponding to the end user, so as to realize setup and update of the address information base. The address information base, for example, is placed in a home network corresponding to the end user, and then the apparatus 2 communicates with the home network based on selection of the end user, so as to store the mapping relationship into the address information base, thereby realizing setup and update of the address information base.

Figure 4:
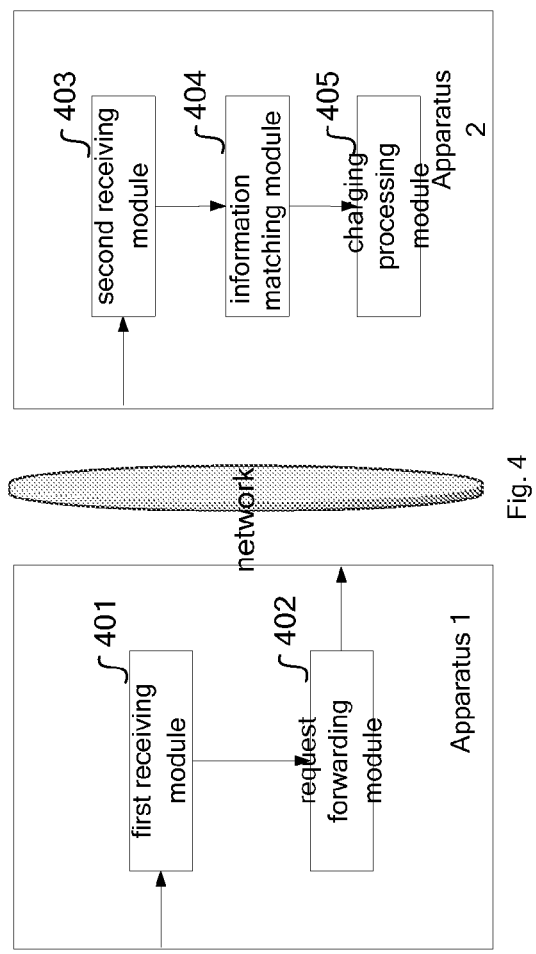
FIG. 4 shows a schematic diagram of an apparatus of performing roaming traffic charging for a user equipment according to another aspect of the present invention.

FIG. 4 shows a schematic diagram of an apparatus of performing roaming traffic charging for a user equipment according to another aspect of the present invention. Apparatus 1 comprises a first receiving device 401 and a request forwarding device 402; apparatus 2 comprises a second receiving device 403, an information matching device 404 and a charging processing device 405.

The first receiving device 401 in the apparatus 1 receives a roaming traffic charging request about the UE, wherein the UE roams to a visited network, wherein the roaming traffic charging request includes roaming traffic-related information of the user equipment.

Here, the apparatus 1 may be located within an OCS of a home public land mobile network (HPLMN) corresponding to the user equipment 1 or independent from an OCS of the home network.

For example, the UE roams to a visited public land mobile network (VPLMN). When the apparatus 1 is located within the OCS of a home network corresponding to the UE1, the first receiving device 401 in the apparatus 1 directly receives the roaming traffic charging request sent from the visited network, e.g., receiving a roaming traffic charging request sent from a network element in the visited network, such as a visited mobile switching center (V-MSC), a gateway mobile switching center (G-MSC), a serving call session control function (S-CSCF), a short message service center (SMSC), a multimedia message service center (MMSC), and a gateway GPRS support node (GGSN)/a packet gateway (PGW), wherein the roaming traffic charging request includes roaming traffic-related information of the UE, for example, information such as calls, SMSs, MMSs or packet data as performed by the UE in the visited network.

Here, the roaming traffic-related information includes, but not limited to, the Mobile Station Roaming Number (MSRN), the International Mobile Subscriber Identity (IMSI), the Mobile Station ISDN Number (MSISDN), the incoming caller phone number, the call timing, SMS, MMS, or packet data, and other information of the user equipment in the visited network.

Those skilled in the art should understand that the above roaming traffic-related information is only an example, and other existing or future possibly evolving roaming traffic-related information, if applicable to the present invention, should also be included within the protection scope of the present invention, which is incorporated here by reference.

For another example, when the apparatus 1 is independent from the home network OCS, the first receiving device 401 in the apparatus 1 may also directly receive the roaming traffic charging request sent from the visited network, for example, receiving the roaming traffic charging request sent from any of the above network elements in the visited network, wherein the roaming traffic charging request includes roaming traffic-related information of the user equipment.

If the roaming traffic-related information satisfies the first charging condition, the request forwarding device 402 in the apparatus 1 will forward the roaming traffic charging request to the OCS of the alternative roaming provider (ARP) corresponding to the user equipment, so as to perform roaming traffic charging for the user equipment, wherein the alternative roaming provider corresponds to a home network of the user equipment; wherein the first charging condition includes at least any one of the following:

the user equipment roams to a member country visited network, and a call/SMS/MMS receiving end of the user equipment is also located in the member country visited network;

the user equipment roams to the member country visited network, and the user equipment receives the call/SMS/MMS;

the user equipment roams to the member country visited network, and the user equipment has a packet data connection;

wherein the member country visited network and the home network of the user equipment have a member protocol.

Here, the member protocol, for example, is the aforementioned EU roaming regulation; the member country visited network, for example, is a mobile network of a country that satisfies the EU roaming regulation.

Here, as shown in FIG. 2, the alternative roaming provider (ARP) corresponds to the home network of the user equipment, and the operator of the home network wholesales the roaming service to different alternative roaming providers; the alternative roaming provider will re-sell the roaming services to the end-user under its own name and on its own account; the home network also provides its roaming services to the end user; the end user chooses one of the roaming services from a plurality of alternative roaming providers and the home network, for example, selecting the cheapest roaming service; the mobile end user will still keep the same number, i.e. not changing the mobile terminal device and his SIM card when the end user is in roaming When the end user roams into a visited network and uses the roaming service in the visited network, the network element in the visited network sends a roaming traffic charging request to the apparatus 1. The apparatus 1 receives the roaming traffic charging request and determines to which OCS the roaming traffic charging request is forwarded based on the roaming traffic-related information included in the charging request, for example, forwarding it to the OCS of the alternative roaming provider selected by the end user, or forwarding it to the OCS in the home network of the end user. For example, based on the call/SMS/MMS receiving end of the user equipment in the visited network as included in the charging request, the apparatus 1 determines that the receiving end is also located within the member country visited network, then the apparatus 1 judges that the roaming traffic-related information satisfies the first charging condition, such that the apparatus 1 will forward the roaming traffic charging request to the OCS of the alternative roaming provider selected in advance by the user equipment; for another example, if the apparatus 1 determines that the user equipment receives the call/SMS/MMS within the member country visited network based on the charging request, then it is judged that the first charging condition is satisfied; for another example, if the apparatus 1 determines that the user equipment has packet data connection in the member country visited network based on the charging request, then it is judged that the first charging condition is satisfied.

If the roaming traffic-related information does not satisfy the first charging condition, then roaming traffic charging is performed for the user equipment within the OCS of the home network of the user equipment; if the apparatus 1 is located within the OCS of the home network, the OCS of the home network directly performs charging for the user equipment; when the apparatus 1 is independent from the OCS of the home network, the apparatus 1 forwards the roaming traffic charging request to the OCS of the home network so as to perform roaming traffic charging for the user equipment.

Those skilled in the art should understand that the above first charging condition is only exemplary, and other existing or future possibly evolving first charging condition, if applicable to the present invention, should also be included within the protection scope of the present invention, which is incorporated hereby by reference.

Here, the OCS of the alternative roaming provider manages and charges the roaming traffic regulated by the new EU roaming regulation, for example, a roaming traffic satisfying the first charging condition as aforementioned. Thus, the alternative roaming provider will be capable of providing the roaming charging rule to the end user, for example, before the end user roams to other country, a roaming service is first subscribed for from a customer relationship management (CRM) system/user website, e.g., a 5-day roaming contract, a 10-day roaming contract, and etc.

The OCS of the home network will manage and charge the non-roaming traffic and those roaming traffics out of new EU regulation scope, e.g. a European subscriber is roaming to the United States, or a EU subscriber roaming in another EU country makes a call to another non-EU subscriber. Such kinds of roaming calls are not regulated by the new EU regulation but are still charged in the OCS of home network.

Preferably, if the roaming traffic-related information satisfies the first charging condition, the request forwarding device 402 in the apparatus 1 performs match query in the address information base, to determine the address information of the OCS of the alternative roaming provider corresponding to the user equipment; forwards the roaming traffic charging request to the OCS of the alternative roaming provider based on the address information, so as to perform the roaming traffic charging for the user equipment, wherein the alternative roaming provider corresponds to the home network of the user equipment.

Specifically, if the roaming traffic-related information satisfies the first charging condition (i.e., when the user equipment roams to the member country visited network, and the call/SMS/MMS receiving end of the user equipment is also located within the member country visited network; or, the user equipment roams to the member country visited network, and the user equipment receives the call/SMS/MMS; or, the user equipment roams to the member country visited network, and the user equipment has a packet data connection; wherein the member country visited network and the home network of the user equipment have a member protocol that is, for example, the EU roaming regulation as aforementioned), the request forwarding device 402 in the apparatus 1 performs match query in the address information base (e.g., stored in the ARP database at the H-MNO end) based on relevant information of the user equipment (e.g., the international mobile subscriber identification number (IMSI), the mobile station international ISDN number, and the like), to determine the address information of the OCS of the alternative roaming provider corresponding to the user equipment, for example, performing match query in the address information base based on the alternative roaming provider selected by the user equipment before roaming to the visited network, to determine the address information of the OCS of the alternative roaming provider; and then, forwards the roaming traffic charging request to the OCS of the alternative roaming provider based on the address information so as to perform the roaming traffic charging for the user equipment, wherein the alternative roaming provider corresponds to the home network of the user equipment.

Here, the address information base stores a mapping relationship between the user equipment and the alternative roaming provider, for example, the mapping relationship between the ISMI of the user equipment, the mobile station international ISDN number, and the OCS address of the alternative roaming provider. The address information base, for example, is located within the home network corresponding to the user equipment, is managed by the home network, and updated by the alternative roaming provider based on the selection of the terminal user.

For example, when the user selects the roaming service of an alternative roaming provider, the present invention enables the alternative roaming provider to update the selection of the terminal user to the address information base (e.g., the ARP database as aforementioned) in the home network, for example, providing information such as the IMSI of the user equipment corresponding to the end user and the mobile station international ISDN number, as well as the address information of OCS of the selected alternative roaming provider, to the ARP database for update. Based on the roaming traffic-related information included in the roaming traffic charging request of the user equipment, the apparatus 1 will know to the OCS of which ARP the roaming traffic charging request is routed, or the roaming traffic charging request is routed to the OCS of the home network.

For example, as shown in FIG. 3, when the terminal user selects to travel to a EU roaming country, it will select an alternative roaming provider that will provide a best roaming plan to the end user; the end user will customize a roaming service from the CRM system/user website of the alternative roaming provider, and the roaming service in the OCS of the alternative roaming provider specifies the user's roaming reservation and charging plan (e.g., a 5-day roaming contract, a 10-day roaming contract); a provisioning system of the alternative roaming provider will send a request to the ARP management system of the H-MNO; the ARP management system of the H-MNO will provide the ARP database (e.g., the aforementioned address information base) to save the alternative roaming provider selected by each user, the address of the OCS of the alternative roaming provider, and the start and end period of the roaming service; afterwards, the end user begins to travel to the EU country; the end user makes a call or receives a call in the EU roaming country; the visited network sends a roaming service charging request about the end user to the apparatus 1 (e.g., an apparatus 1 in the OCS of the H-MNO or an apparatus 1 independent from the OCS), and the apparatus 1 will confirm the roaming service in the ARP database and determines to the OCS of which alternative roaming provider the charging request is forwarded, or directly sends it to the OCS of the home network; afterwards, the charging request is forwarded to the OCS of the alternative roaming provider or directly sent to the OCS of the home network.

Correspondingly, at the alternative roaming provider, an second receiving device 403 in the apparatus 2 receives the roaming traffic charging request for performing roaming traffic charging for the user equipment, wherein the roaming traffic charging request includes roaming traffic-related information of the user equipment; an information matching device 404 in the apparatus 2 performs match query in the user database based on the roaming service charging request to obtain roaming reservation information of the user equipment; a charging processing device 405 in the apparatus 2 performs roaming traffic charging for the user equipment based on the roaming traffic-related information and the roaming reservation information. Here, the alternative roaming provider corresponds to the home network of the user equipment.

Specifically, the second receiving device 403 in the apparatus 2 in the alternative roaming provider receives the roaming traffic charging request forwarded by the request forwarding device 402 in the apparatus 1. Afterwards, the information matching device 404 in the apparatus 2 performs match query in the user database based on the roaming traffic charging request to obtain the roaming reservation information of the user equipment. For example, the apparatus 2 performs match query in the user database based on the mobile station roaming number, the IMSI, and the mobile station international ISDN number of the user equipment in the visited network, which are included in the roaming traffic charging request, to determine the roaming package selected by the user equipment (e.g., 5-day roaming contract, 10-day roaming contract, and other roaming reservation information); and then, the charging processing device 405 in the apparatus 2 (e.g., the OCS in the alternative roaming provider) performs roaming traffic charging (e.g., performing fee deduction processing in the account of the user equipment) for the user equipment based on the roaming traffic-related information included in the roaming traffic charging request (e.g., call duration, SMS, MMS, packet data, and other information) as well as roaming reservation information such as the roaming package selected by the end user.

Preferably, after the apparatus 2 performs roaming traffic charging for the user equipment, it obtains corresponding charging result information (e.g., fee deduction amount from the account, account balance, and other information), and then sends the charging result information to the apparatus 1 through a predetermined interface (e.g., a CAP interface, a DCCA interface, etc.) with the apparatus 1.

Here, the user database stores the mapping relationship between the IMSI, the mobile station international ISDN number of the user equipment, and the selected roaming package information, and may perform setup or update based on the roaming package selected by the end user.

This invention provides an innovative online charging solution to support an alternative roaming provider which is based on the new EU roaming regulation and independent from the H-MNO to perform roaming charging. The present invention enables an operator to support the new EU regulation, and fulfill most of EU Commission's expectation (especially the timeframe 2014), without causing a great impact on the core network. Meanwhile, the present invention reduces the impact to the core network implementation. It does not change the CAMEL protocol, thereby greatly simplifying the core network implementation, which makes the solution easier to implement.

In another preferred embodiment, if the roaming traffic-related information satisfies a second charging condition, roaming traffic charging is performed for the user equipment in the OCS of the home network of the user equipment, wherein the second charging condition includes at least one of the following:

the user equipment roams to a visited network outside of the member country visited network;

the user equipment roams to the member country visited network, but the call/SMS/MMS receiving end of the user equipment is located in a visited network outside of the member country visited network;

the user equipment roams to the member country visited network to access a content service.

For example, the apparatus 1 confirms, based on the roaming traffic-related information included in the charging request, that the user equipment roams to a visited network outside of the member country visited network, or although the user equipment roams to the member country visited network, the call/SMS/MMS receiving end of the user equipment is located at a visited network outside of the member country visited network, or although the user equipment roams to the member country visited network, it accesses a content service in the member country visited network (for example, downloading, online booking, etc.), then apparatus 1 judges that the second charging condition is satisfied, and the OCS in the home network of the user equipment performs roaming traffic charging for the user equipment.

Here, when the user equipment is located in the home network, it is still the OCS of the home network that performs charging for the user equipment.

Here, when the apparatus 1 is located in the OCS of the home network, if the roaming traffic-related information satisfies the second charging condition, then the OCS of the home network directly performs the roaming traffic charging for the user equipment.

When the apparatus 1 is independent from the OCS of the home network, if the roaming traffic-related information satisfies the second charging condition, the apparatus 1 forwards the roaming traffic charging request to the OCS of the home network, such that the OCS of the home network performs charging for the user equipment.

Those skilled in the art should understand that the above second charging condition is only exemplary, and other existing or future possibly evolving second charging condition, if applicable to the present invention, should also be included within the protection scope of the present invention, which is incorporated here by reference.

Preferably, the apparatus 2 in the alternative roaming provider also comprises a first updating device (not shown). The first updating device obtains candidate roaming reservation information of a candidate user equipment, and builds or updates the user database based on the candidate roaming reservation information.

Specifically, the first updating device in the apparatus 2 in the alternative roaming provider obtains the candidate roaming reservation information of the candidate user equipment, for example, the roaming package selected by the end user before roaming to the visited network, and other information. The first updating device determines the candidate roaming reservation information based on selection of the end user, and then stores the candidate roaming reservation information into a user database to realize setup or update of the user database.

For example, before the end user roams to the visited network, it reserves a roaming service (e.g., a 5-day roaming contract, a 10-day roaming contract, and etc.) from the CRM system/user website of the alternative roaming provider. The first updating device in the apparatus 2 determines the candidate roaming reservation information of the candidate user equipment corresponding to the end user based on selection of the end user, and stores the candidate roaming reservation information into the user database, for example, storing the mapping relationship between the candidate roaming reservation information and the IMSI, the mobile station international ISDN number of the candidate user equipment, and the like, into the user database, so as to build or update the user database.

Preferably, the apparatus 2 in the alternative roaming provider also comprises a second updating device (not shown). The second updating device builds or updates the address information base based on the mapping relationship between the candidate user equipment and the alternative roaming provider, wherein the address information base stores the address information of the OCS of the alternative roaming provider.

Specifically, when the end user selects an alternative roaming provider, the second updating device in the apparatus in the alternative roaming provider will immediately stores the mapping relationship between it and a candidate user equipment corresponding to the end user, so as to realize setup and update of the address information base. The address information base, for example, is placed in a home network corresponding to the end user, and then the second updating device in the apparatus 2 communicates with the home network based on selection of the end user, so as to store the mapping relationship into the address information base, thereby realizing setup and update of the address information base.

FIGS. 5-12 show schematic diagrams of different roaming traffic scenarios regulated by the new EU roaming regulation.

Figure 5:
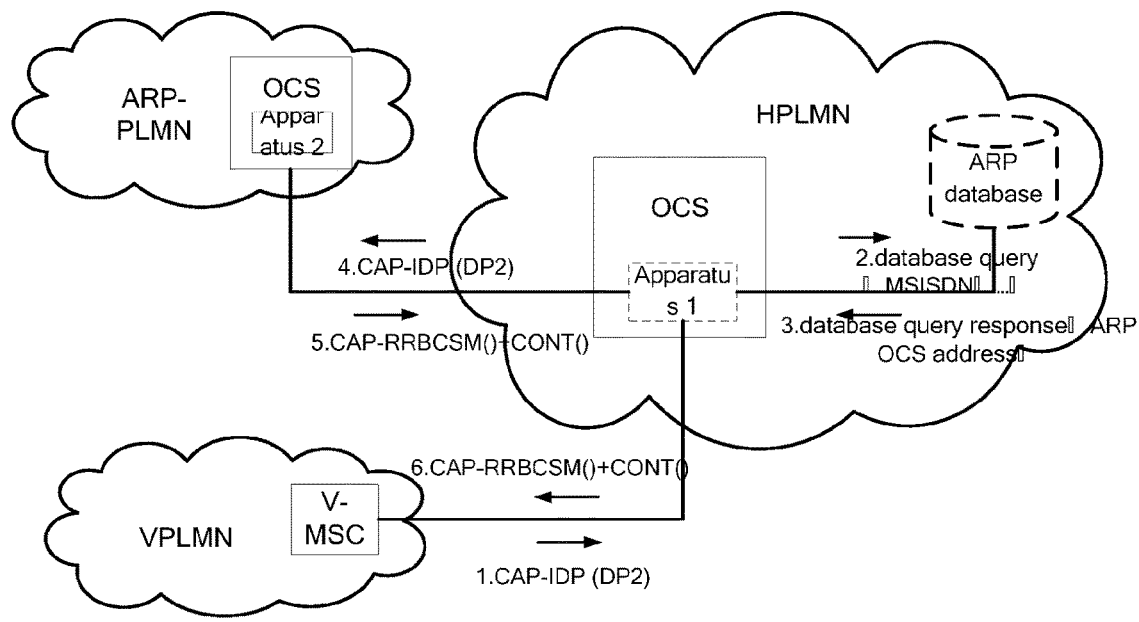
FIG. 5 shows a scenario of a traditional voice call in which a user equipment initiates a call.

FIG. 5 shows a scenario of a traditional voice call in which a user equipment initiates a call.

Here, the interface between the apparatus 1 and the apparatus 2 is based on the CAP interface, or when the apparatus 1 is located in the OCS of the home network and the apparatus 2 is located in the OCS of the alternative roaming provider, then the interface between the OCS of the alternative roaming provider and the home network OCS is based on the CAP interface. A network element in the visited network of the user equipment, i.e., the visited mobile switching center (V-MSC), sends a roaming traffic charging request to the apparatus 1, the roaming traffic charging request includes the roaming traffic-related information of the user equipment in the visited network; the apparatus 1 performs match query in the ARP database (i.e., the aforementioned address information base) based on the roaming traffic charging request to validate the user equipment and determine an OCS for performing roaming traffic charging for the user equipment; the ARP database returns, to apparatus 1, the address information of the OCS of the alternative roaming provider for performing roaming traffic charging for the user equipment; the apparatus 1, forwards the roaming traffic charging request to the apparatus 2 of the alternative roaming provider according to the address information based on the CAP interface, the roaming traffic charging request including roaming traffic-related information of the user equipment in the visited network; the OCS of the alternative roaming provider performs charging for the user equipment and returns the charging result information to the apparatus 1 based on the CAP interface; the apparatus 1 then returns the charging result information to the visited mobile switching center in the visited network.

Here, the apparatus 1 may be located in the OCS of the home network corresponding to the user equipment 1 or independent from the OCS of the home network.

The charging processes in FIGS. 6-12 are identical or substantially identical to the process shown in FIG. 5, which therefore will not be detailed here, but incorporated here by reference.

Figure 6:
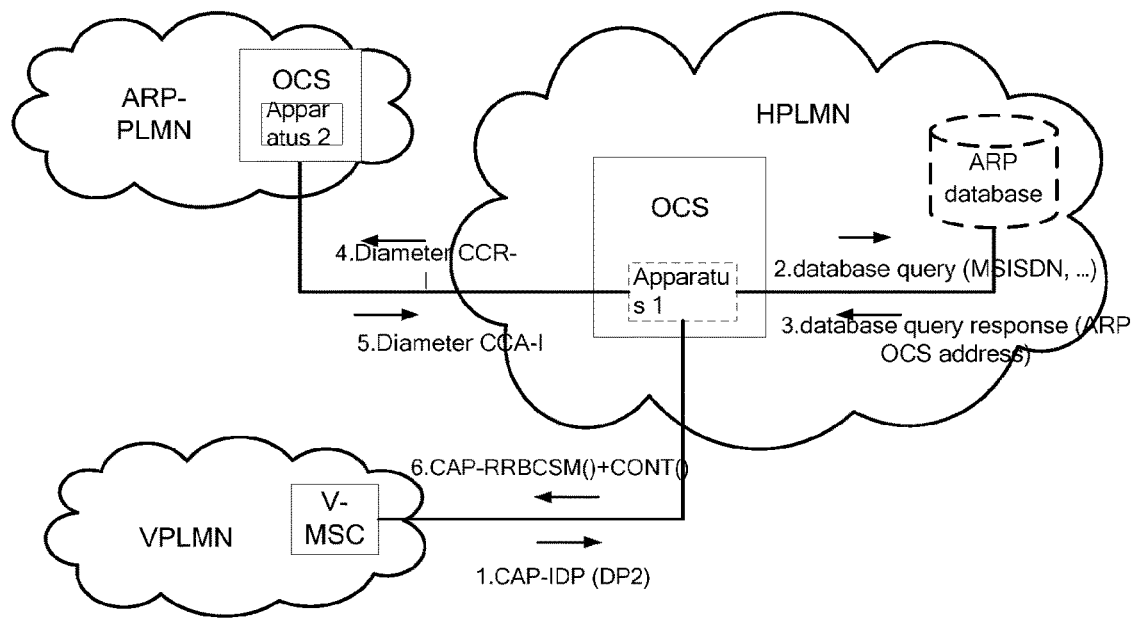
FIG. 6 shows a scenario of a traditional voice call in which a user equipment initiates a call.

FIG. 6 shows a scenario of a traditional voice call in which a user equipment initiates a call, wherein an interface between an alternative roaming provider OCS and an apparatus 1 is based on a DCCA interface.

Figure 7:
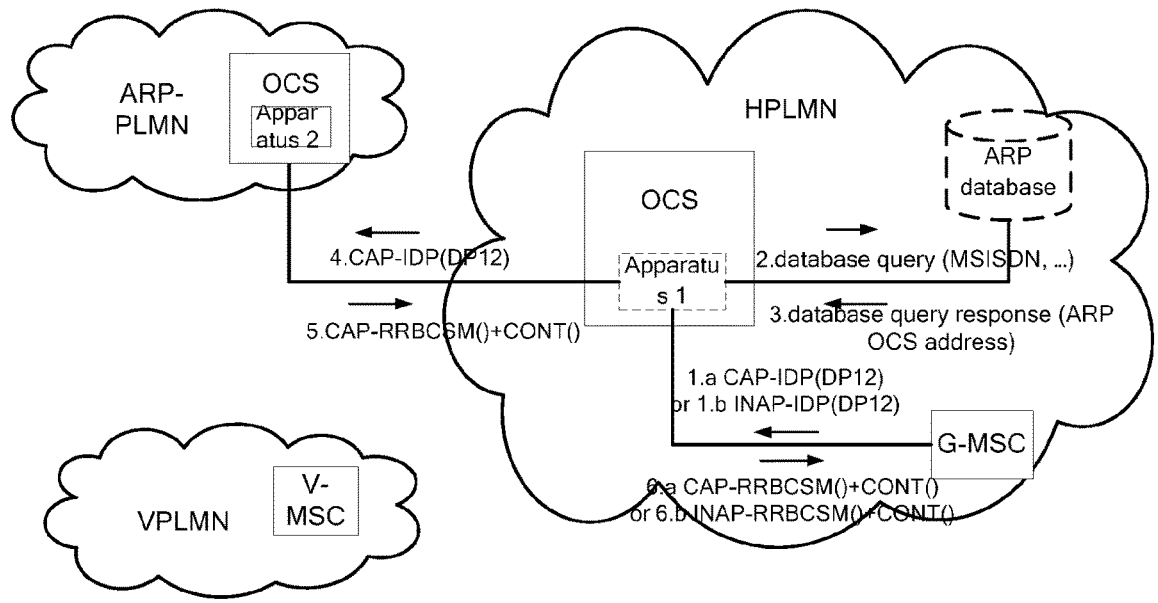
FIG. 7 shows a scenario of a traditional voice call in which a user equipment is called.

FIG. 7 shows a scenario of a traditional voice call in which a user equipment is called, wherein an interface between an alternative roaming provider OCS and an apparatus 1 is based on a CAP interface, wherein a network element in the visited network of the user equipment, i.e., a Gateway-Mobile Switching Center (G-MSC), sends a roaming traffic charging request to the apparatus 1.

Figure 8:
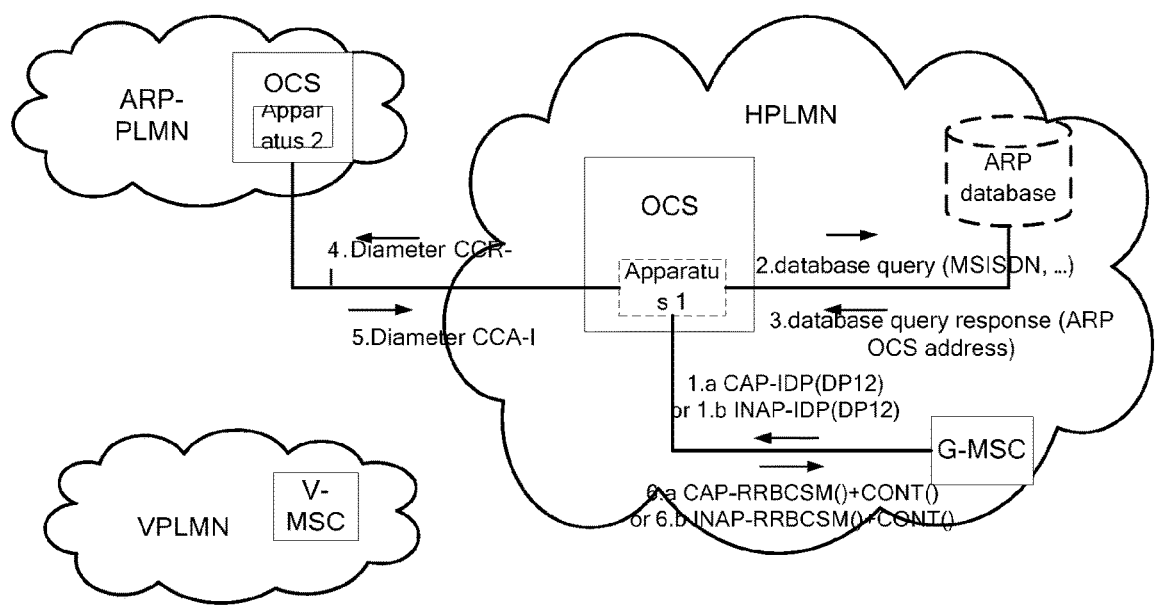
FIG. 8 shows a scenario of a traditional voice call in which a user equipment is called.

FIG. 8 shows a scenario of a traditional voice call in which a user equipment is called, wherein an interface between an alternative roaming provider OCS and an apparatus 1 is based on a DCCA interface, wherein a network element in the visited network of the user equipment, i.e., a Gateway-Mobile Switching Center (G-MSC), sends a roaming traffic charging request to the apparatus 1.

Figure 9:
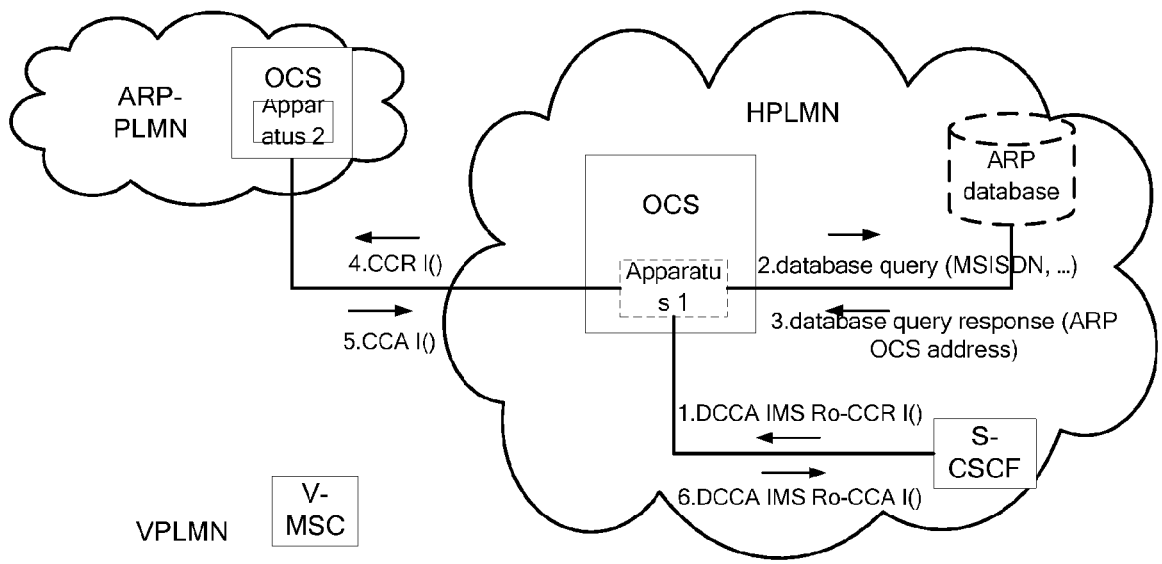
FIG. 9 shows a scenario of an IP Multimedia Subsystem Voice over Internet Phone Call (IMS VoIP Call) in which a user equipment initiates a call or is called.

FIG. 9 shows a scenario of an IP Multimedia Subsystem Voice over Internet Phone Call (IMS VoIP Call) in which a user equipment initiates a call or is called, wherein a network element in the visited network of the user equipment, i.e., a service call session control function (S-CSCF) sends a roaming traffic charging request to the apparatus 1.

Figure 10:
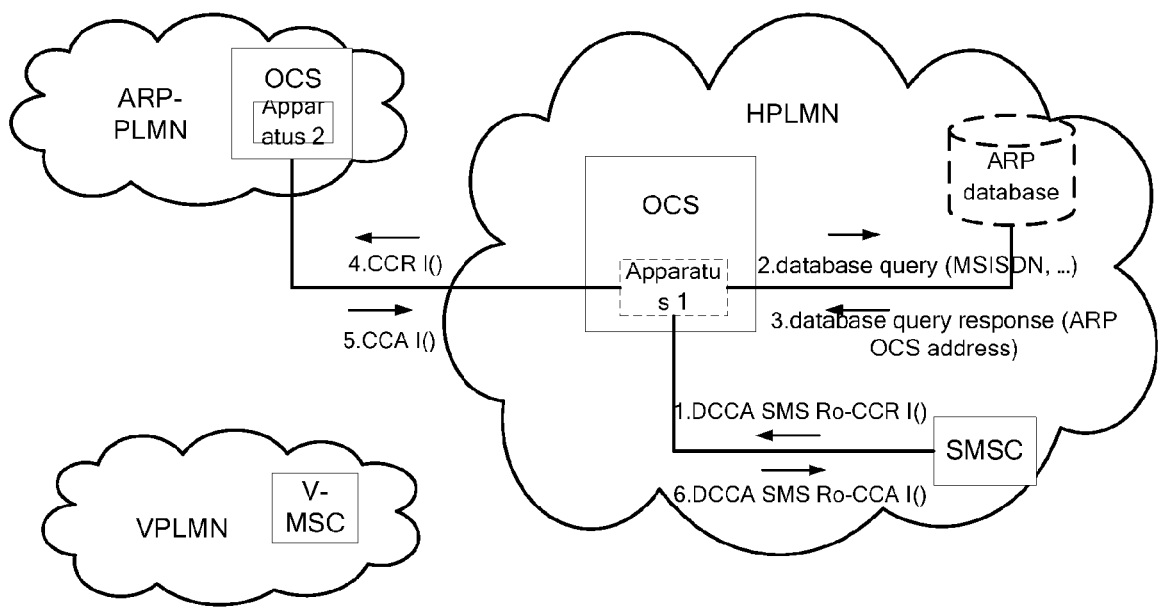
FIG. 10 shows a scenario in which a user equipment initiates a Short Messaging Service (SMS)/an SMS is sent/an SMS status is reported to a user equipment.

FIG. 10 shows a scenario in which a user equipment initiates a Short Messaging Service (SMS)/an SMS is sent/an SMS status is reported to a user equipment, wherein a network element in the visited network of the user equipment, i.e., the short message service center (SMSC) sends a roaming traffic charging request to the apparatus 1.

Figure 11:
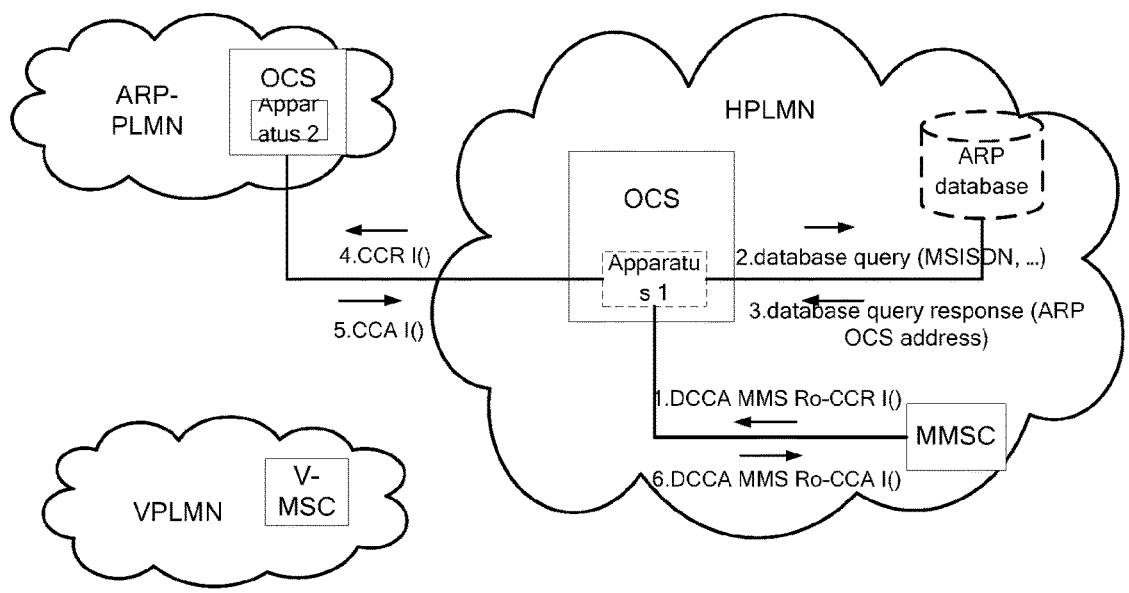
FIG. 11 shows a scenario in which a user equipment initiates a Multimedia Messaging Service (MMS)/an MMS is sent/an MMS status is reported to a user equipment.

FIG. 11 shows a scenario in which a user equipment initiates a Multimedia Messaging Service (MMS)/an MMS is sent/an MMS status is reported to a user equipment, wherein a network element in the visited network of the user equipment, i.e., the multimedia message service center (MMSC) sends a roaming traffic charging request to the apparatus 1.

Figure 12:
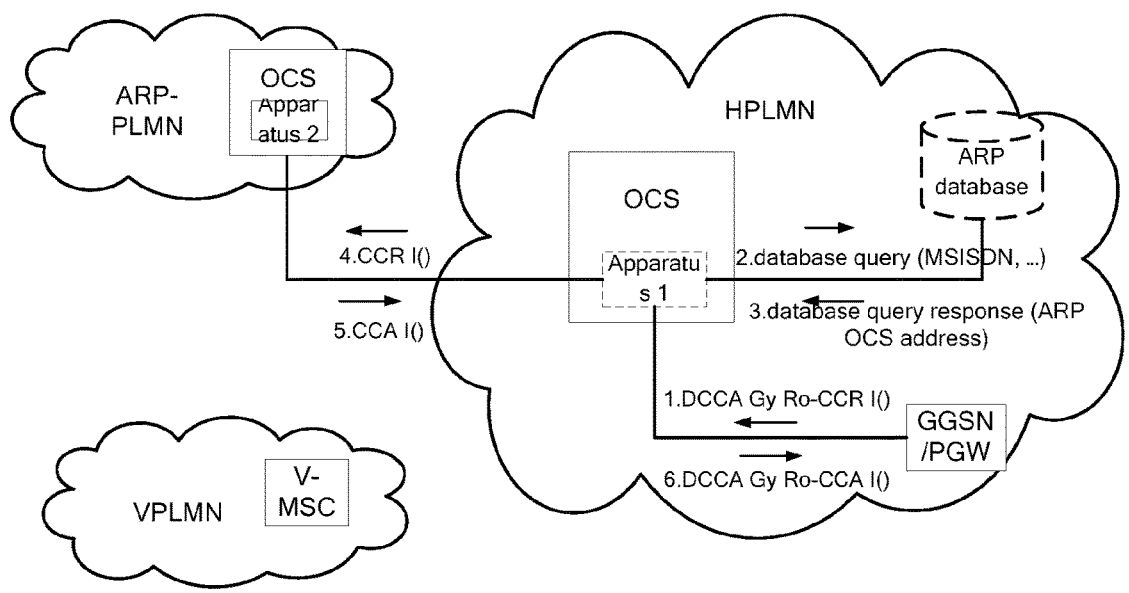
FIG. 12 shows a scenario in which a user equipment uses an LTE/UMTS/GPRS packet data in the visited network.

FIG. 12 shows a scenario in which a user equipment uses an LTE/UMTS/GPRS packet data in the visited network, wherein a network element in the visited network of the user equipment, a gateway GPRS support node (GGSN)/packet gateway (PGW) sends a roaming traffic charging request to the apparatus 1.

It should be noted that the present invention may be implemented in software and/or a combination of software and hardware, for example, it may be implemented by an application-specific integrated circuit ASIC, a general purpose computer or any other similar hardware device. In one embodiment, the software program of the present invention may be executed through a processor to implement the steps or functions as mentioned above. Likewise, the software program of the present invention (including relevant data structure) may be stored in the computer-readable recording medium, for example, RAM memory, magnetic or optic driver or flappy disk or similar devices. Besides, some steps or functions of the present invention may be implemented by hardware, for example, as a circuit cooperating with the processor to execute various steps or functions.

Besides, a part of the present invention may be applied as a computer program product, for example, a computer program instruction, which, when executed by a computer, through the operation of the computer, may invoke or provide the method and/or technical solution of the present invention. However, the program instruction invoking the method of the present invention may be stored in a fixed or mobile recording medium, and/or transmitted through a data stream in broadcast or other signal carrier medium, and/or stored in a working memory of a computer device running according to the program instruction. Here, one embodiment according to the present invention comprises an apparatus that includes a memory for storing computer program instructions and a processor for executing program instructions, wherein when the computer program instructions are executed by the processor, the apparatus is triggered to run the methods and/or technical solutions based on the previously mentioned multiple embodiments of the present invention.

To those skilled in the art, it is apparent that the present invention is not limited to the details of above exemplary embodiments, and the present invention can be implemented with other specific embodiments without departing the spirit or basic features of the present invention. Thus, from any perspective, the embodiments should be regarded as illustrative and non-limiting. The scope of the present invention is limited by the appended claims, instead of the above description. Thus, meanings of equivalent elements falling within the claims and all variations within the scope are intended to be included within the present invention. Any reference numerals in the claims should be regarded as limiting the involved claims. Besides, it is apparent that such terms as "comprise" and "include" do not exclude other units or steps, and a single form does not exclude a plural form. The multiple units or modules as stated in apparatus claims can also be implemented by a single unit or module through software or hardware. Terms such as first and second are used to represent names, not representing any specific sequence.

What is claimed is:

1. A method for performing roaming traffic charging for a user equipment, wherein the method comprises:
receiving, in a network element of a home network, a roaming traffic charging request about the user equipment, wherein the user equipment roams to a visited network, the roaming traffic charging request includes roaming traffic-related information of the user equipment;
if the roaming traffic-related information satisfies a first charging condition, forwarding, by the network element of the home network, the roaming traffic charging request to an OCS of an alternative roaming provider corresponding to the user equipment so as to perform the roaming traffic charging for the user equipment, wherein the alternative roaming provider corresponds to a home network of the user equipment, wherein the forwarding comprises: if the roaming traffic-related information satisfies the first charging condition, performing match query in an address information base, to determine address information of the OCS of the alternative roaming provider corresponding to the user equipment; forwarding the roaming traffic charging request to the OCS of the alternative roaming provider based on the address information, so as to perform the roaming traffic charging for the user equipment, wherein the alternative roaming provider corresponds to the home network of the user equipment.

2. The method according to claim 1, wherein the first charging condition comprises at least one of the following:
the user equipment roams to a member country visited network, and a call/SMS/MMS receiving end of the user equipment is also located in the member country visited network;
the user equipment roams to the member country visited network, and the user equipment receives the call/SMS/MMS;
the user equipment roams to the member country visited network, and the user equipment has a packet data connection;
wherein the member country visited network and the home network of the user equipment have a member protocol.

3. The method according to claim 1, wherein the forwarding further comprises:
if the roaming traffic-related information satisfies a second charging condition, performing the roaming traffic charging for the user equipment in the OCS of the home network of the user equipment;
wherein the second charging condition includes at least one of the following:
the user equipment roams to a visited network outside of a member country visited network;
the user equipment roams to the member country visited network, but the call/SMS/MMS receiving end of the user equipment is located in a visited network outside of the member country visited network;
the user equipment roams to the member country visited network to access a content service;
wherein the member country visited network and the home network of the user equipment have a member protocol.

4. A method, at an alternative roaming provider, for performing roaming traffic charging for a user equipment, wherein the alternative roaming provider corresponds to a home network of the user equipment, the method comprising:
receiving, in an online charging system (OCS) of the alternative roaming provider, a roaming traffic charging request for performing roaming traffic charging for a user equipment for an OCS of a Home network of the user equipment, wherein the roaming traffic charging request includes roaming traffic-related information of the user equipment due to the OCS of the Home network determining roaming traffic-related information satisfies a first charging condition, and a match query in an address information base determining address information of the OCS of the alternative roaming provider corresponding to the user equipment and forwarding the roaming traffic charging request to the OCS of the alternative roaming provider based on the address information;
performing match query in a user database based on the roaming traffic charging request to obtain roaming reservation information of the user equipment;
performing the roaming traffic charging for the user equipment based on the roaming traffic-related information and the roaming reservation information.

5. The method according to claim 4, the method further comprising:
obtaining candidate roaming reservation information of a candidate user equipment;
building or updating the user database based on the candidate roaming reservation information.

6. The method according to claim 5, wherein the method further comprises:
building or updating an address information base based on a mapping relationship between the candidate user equipment and the alternative roaming provider, wherein the address information base stores address information of an OCS of the alternative roaming provider.

7. An apparatus for performing roaming traffic charging for a user equipment, wherein the apparatus comprises:
a first receiving device configured to receive a roaming traffic charging request about the user equipment, wherein the user equipment roams to a visited network, the roaming traffic charging request includes roaming traffic-related information of the user equipment;
a request forwarding device configured to, if the roaming traffic-related information satisfies a first charging condition, perform match query in an address information base, to determine address information of an OCS of the alternative roaming provider corresponding to the user equipment forward the roaming traffic charging request to an OCS of an alternative roaming provider corresponding to the user equipment based on the address information so as to perform the roaming traffic charging for the user equipment, wherein the alternative roaming provider corresponds to a home network of the user equipment.

8. The apparatus according to claim 7, wherein the first charging condition comprises at least one of the following:
the user equipment roams to a member country visited network, and a call/SMS/MMS receiving end of the user equipment is also located in the member country visited network;
the user equipment roams to the member country visited network, and the user equipment receives the call/SMS/MMS;

the user equipment roams to the member country visited network, and the user equipment has a packet data connection;
wherein the member country visited network and the home network of the user equipment have a member protocol.

9. The apparatus according to claim 7, wherein the request forwarding device is further configured to:
if the roaming traffic-related information satisfies a second charging condition, perform the roaming traffic charging for the user equipment in the OCS of the home network of the user equipment;
wherein the second charging condition includes at least one of the following:
the user equipment roams to a visited network outside of the member country visited network;
the user equipment roams to the member country visited network, but the call/SMS/MMS receiving end of the user equipment is located in a visited network outside of the member country visited network;
the user equipment roams to the member country visited network to access a content service;
wherein the member country visited network and the home network of the user equipment have a member protocol.

10. An apparatus, at an alternative roaming provider, for performing roaming traffic charging for a user equipment, wherein the alternative roaming provider corresponds to a home network of the user equipment, the apparatus comprising:
a second receiving device configures to receive a roaming traffic charging request for performing roaming traffic charging for a user equipment from an OCS of the home network, wherein the roaming traffic charging request includes roaming traffic-related information of the user equipment due to an OCS of the home network determining roaming traffic-related information satisfies a first charging condition, and a match query in an address information base determining address information of the apparatus at the alternative roaming provider corresponding to the user equipment and forwarding the roaming traffic charging request to the OCS of the alternative roaming provider based on the address information;
an information matching device configures to perform match query in a user database based on the roaming traffic charging request to obtain roaming reservation information of the user equipment;
a charging processing device configured to perform the roaming traffic charging for the user equipment based on the roaming traffic-related information and the roaming reservation information.

11. The apparatus according to claim 10, wherein the apparatus further comprises a first updating device configured to:
obtain candidate roaming reservation information of a candidate user equipment;
build or update the user database based on the candidate roaming reservation information.

12. The apparatus according to claim 11, wherein the apparatus further comprises:
a second updating device configured to build or update an address information base based on a mapping relationship between the candidate user equipment and the alternative roaming provider, wherein the address information base stores address information of an OCS of the alternative roaming provider.

13. An OCS for performing roaming traffic charging for a user equipment, comprising an apparatus according to claim 7.

* * * * *